Figure 1:
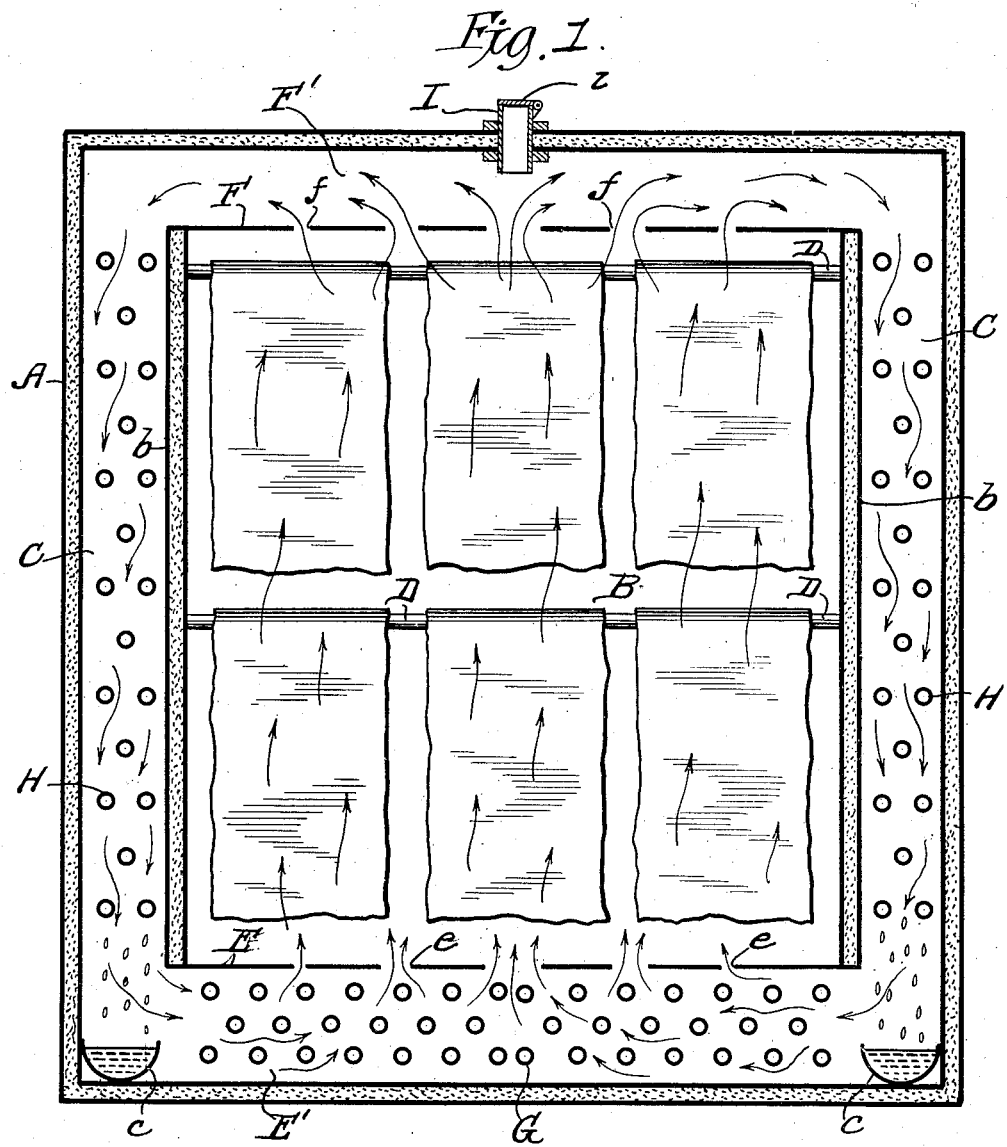

Dec. 8, 1925. 1,564,782
G. D. HARRIS
METHOD OF AND APPARATUS FOR DRYING
Filed May 6, 1921 2 Sheets-Sheet 2
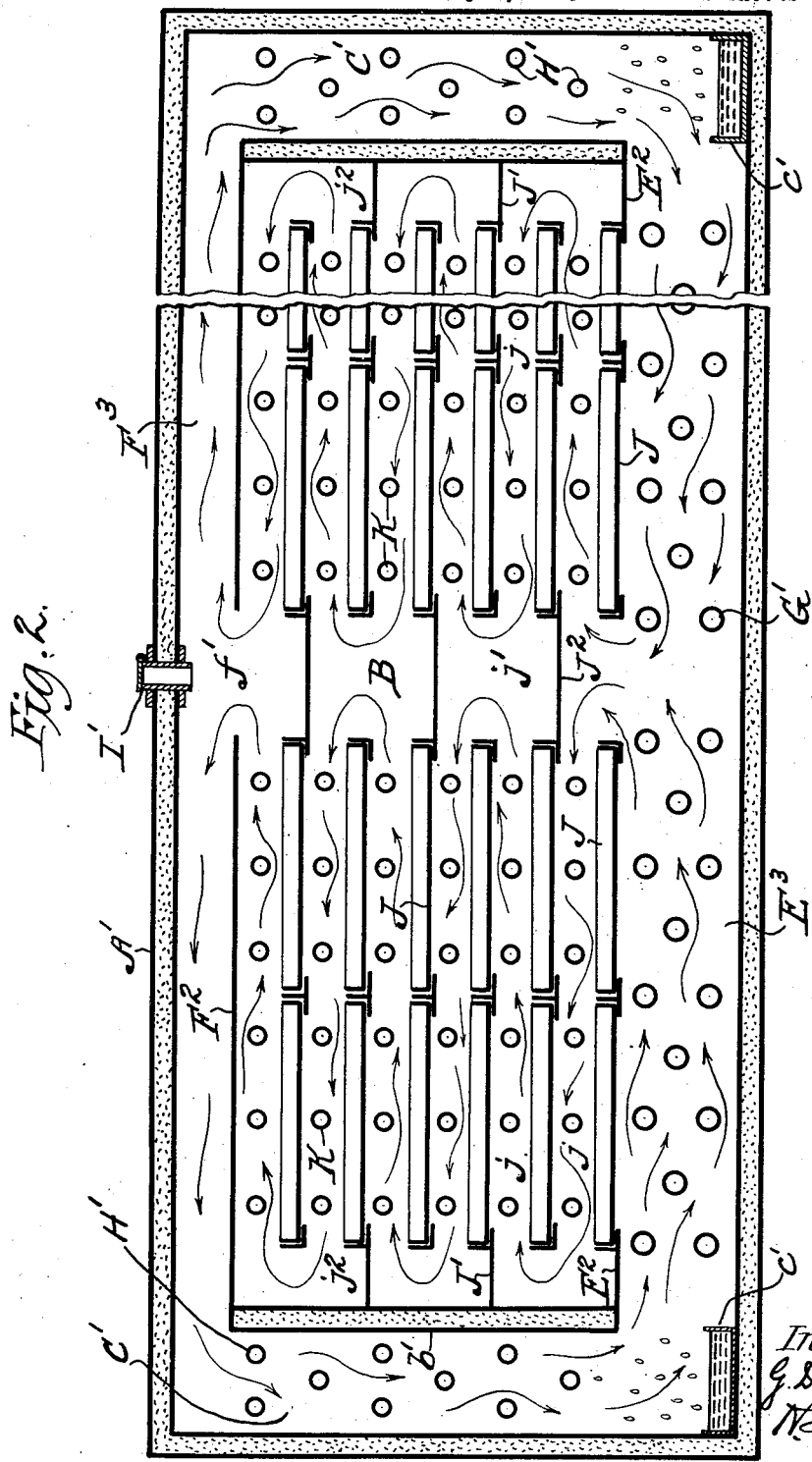

Patented Dec. 8, 1925.

1,564,782

UNITED STATES PATENT OFFICE.

GORDON DON HARRIS, OF ISLIP, NEW YORK, ASSIGNOR, BY MESNE ASSIGNMENTS, TO THE INDUSTRIAL DRYER CORPORATION, OF STAMFORD, CONNECTICUT, A CORPORATION OF CONNECTICUT.

METHOD OF AND APPARATUS FOR DRYING.

Application filed May 6, 1921. Serial No. 467,492.

*To all whom it may concern:*

Be it known that I, GORDON DON HARRIS, a citizen of the United States, residing at Islip, county of Suffolk, and State of New York, have invented a certain new and useful Method of and Apparatus for Drying, of which the following is a specification.

This invention pertains to the art of drying wherein the operation is conducted in a partial vacuum and within a tightly closed chamber to which no outside atmospheric air is admitted during the operation of exchanging heat for moisture, and within which chamber the circulation of the drying atmosphere is effected by successively expanding and condensing said atmosphere through the agency of appropriate heating means and of condensing means. The rapidity of flow of the drying atmosphere within the closed chamber is controllable by the action of the condenser in chilling the atmosphere and by the action of the heater in expanding said atmosphere, provision being made for controlling at will the flow of a cooling agent within the condenser and for regulating the heating means so as to give off more or less heat units to said atmosphere.

The drying atmosphere is conditioned with reference to humidity by the absorption of the aqueous vapors from the material under treatment, and the action of the condenser in the elimination from said atmosphere, of more or less aqueous vapors; and, furthermore, said drying atmosphere is conditioned in respect to temperature by the operation of the heater. It is thus made possible to regulate the moisture and heat content of the drying atmosphere, and such conditioning of the atmosphere when performed within a chamber in which is established and maintained an atmosphere at a pressure less than that of the outside atmospheric air enables the treatment of the material to be conducted in a manner to preclude oxidation of the material and to prevent the formation of a film on the surface thereof, besides keeping the pores of such material open for the free exit of the aqueous content of said material.

According to this invention, the moisture content of the drying atmosphere is determined by the action of the condensers having means for controlling the flow therethrough of a cooling medium whereby the condenser is regulatable for its surfaces to be kept in a cold condition, or at the dew point, for condensing the aqueous vapors present in such atmosphere, the condensate being discharged from the circulatory path. Concurrently with the condensation of the aqueous and volatile vapors, the drying atmosphere is chilled so that it descends within one part of the circulatory path, following which descent the atmosphere is expanded by the action of heating means situated in another part of the circulatory path, whereby the successive condensing and expansion of the atmosphere attains or results in the required circulation within the chamber to which atmospheric air is not admitted during the treating period. The aqueous vapors from the material are absorbed, at least partially, by the flowing atmosphere, the same being initially expanded by the action of the heaters, which expansion of the atmosphere within the closed chamber tends at certain periods, more or less frequent, to establish within the chamber a pressure in excess of the outside atmospheric pressure due to the expansion of the atmosphere, whereupon the pressure within the chamber operates a valved exit, to open the latter and thus permit the escape from the chamber of some of the expanded air until the pressure within the chamber is less than the pressure of the outside atmospheric air, the effect of which is to allow the valve at the exit to be closed by atmospheric pressure, whereby the valved exit from the chamber is opened automatically for the exit of a certain proportion of the atmosphere within the chamber, and which exit remains in said opened condition until the internal pressure is reduced to a point below atmospheric pressure (14.7), and thereupon the valved exit is closed automatically by the atmospheric pressure exceeding the internal chamber pressure.

Other functions and advantages of the invention will appear from the following description taken in connection with the drawings, wherein—

Figure 1 is a vertical sectional elevation through a drying apparatus wherein the material is suspended within the treating chamber, and Figure 2 is a vertical longitudinal section of another embodiment of the invention equipped with trays or other means for supporting the material.

The constructional form of apparatus illustrated in Figure 1 embodies a housing A, the walls of which are insulated in any preferred manner and constructed so as to exclude the ingress of outside atmospheric air. The interior of the housing is divided by walls b, preferably insulated, said walls being arranged to produce a circulatory path for the drying atmosphere with a main chamber B for the ascent of the drying atmosphere and with one or more other chambers C C for the descent of such atmosphere. The main chamber B is relatively large in cross section as compared with the other chamber or chambers; for convenience the chamber B may be referred to as the material or treating chamber, whereas the other chambers C C will be designated as the cooling chambers. The material to be treated is supported within chamber B by any known means, but as shown in Figure 1 the chamber is adapted for the hanger rods D by which the material, such as rubber slabs, sheet cork, etc., is suspended in a manner to provide spaces for the circulation of the drying atmosphere around and in contact with said material. The workman obtains access to chamber B through suitable doors, as usual, which doors must or should be closed tightly in conducting the drying operation.

Across the lower part of chamber B is a floor E and across the top of said chamber is a roof F. The floor and the roof are shown as extending parallel to the bottom and the top, respectively, of the housing, whereby a heater chamber E' is provided below chamber B and a horizontal flue or duct F' is formed over said chamber, said heater chamber E' being in communication at its ends with the side cooling chambers C C and horizontal flue F' being in communication, also, with the cooling chambers C C, said chamber E' and flue F' constituting parts of the closed circulatory path for the drying atmosphere. The floor E of chamber B is provided with ports e by which the atmosphere, heated within the chamber E', is free to ascend into chamber B, and in like manner, the roof F is provided with ports f through which the atmosphere flows from chamber B into the flue F', and thence to the cooling chambers C C.

A heating means of any appropriate character is positioned within chamber E'; as shown said heater is embodied in the form of coils G, and provision is made, as usual, for controlling the flow of a heating medium to said coils.

The cooling or condensing means is shown as comprising coils H H positioned within chambers C C, said coils being provided with means for controlling the flow of a cooling medium to and through said coils; said cooling medium being either the usual refrigerating agent, or cold water, or any other agent acting to chill the surfaces of coils H H to at least the temperature known as the dew point, necessary to condense the aqueous content of the drying atmosphere upon the surfaces of said coils. The moisture of condensation, or the condensate, collecting upon the surfaces of the cooling coils is discharged from the circulatory path of the drying atmosphere; as shown, the condensate is free to drip from the cooling coils into collecting troughs c positioned at the bottom of the chambers C, and said troughs are, or may obviously be arranged to discharge the condensate to the exterior of the housing.

I is a vent provided with a valve i, the latter being closed normally by the external atmospheric pressure. Said vent is shown as a pipe extending through the top of the housing for free communication with the interior thereof. The valve associated with said vent is or may be of any suitable constructional form; but said valve is positioned for exposure to the pressure of the drying atmosphere within the housing and to the pressure of the atmospheric air exterior to said housing, said valve being held to its seat normally by atmospheric pressure for the purpose of excluding the inflow of outside atmospheric air to the housing as well as to cut off normally the outflow of the drying atmosphere from said housing.

In operation, the material is hung within the chamber B and the apparatus is closed tightly for excluding the ingress of outside atmospheric air during the drying period. Steam is supplied to heater G and a cooling medium to condensers H, the action of the heater upon the atmosphere present in chamber E' tending to expand the atmosphere, whereas the cold surfaces of the coils H chills the atmosphere, as a result of which expansion and chilling the atmosphere circulates within the closed circulatory path constituted by chamber B, top flue F', side chambers C C, and bottom chamber E'. The flow of the atmosphere heated within chamber E' is baffled by the floor E, so that the atmosphere must flow in definite paths from chamber E' into chamber B determined by the location of ports e, and the atmosphere flowing upwardly within chamber B is free to have the desired contact with the material whereby the heat units carried by the atmosphere are given off to the material to effect the exchange of heat for moisture, the aqueous content of the material being given off and taken up by the atmosphere which thus constitutes the carrier for heat and moisture. The atmosphere flows out of chamber B through ports f and is directed by flue F' toward and into the side chambers C C, whereupon the contact of the atmosphere with the cold surfaces of the condensers H has the effect of condensing the aqueous content present in such atmosphere and of chilling or reducing the temperature of such atmosphere, with the result that the atmosphere descends within the chambers C C and thence flows into chamber E', to be again expanded by the action of heater G.

The atmosphere is thus expanded and condensed, the effect of which is to insure circulation within a closed path due to the difference in temperature brought about by the action of the condensers and heater, and during the cycle of operations the atmosphere carries heat to the material so as to drive off the moisture, takes up the aqueous content of such material, carries the moisture to the condensers, and gives off a percentage, or substantially the whole, of such moisture by contact with the chilled surfaces of the condensers, all of which cycle of operations are performed without the aid of any moving parts and within a chamber closed against the ingress of outside atmospheric air. The alternate expansion and condensation of the atmosphere required to effectuate the circulation, and the vaporization and expansion of the aqueous content of the atmosphere by the heating operations, has the effect of increasing the pressure of the atmosphere to a point where such pressure within the chamber exceeds the pressure of the outside atmospheric air, the result of which is to open vent valve $i$ for such a period as will permit the exit of a certain volume of the drying atmosphere without, however, admitting atmospheric air to the chamber for the reason that upon the reduction of the pressure within the chamber the vent valve $i$ is closed automatically by the pressure of the external atmosphere. The vent valve is opened initially or intermittently for the exit of a certain proportion of the drying atmosphere, thus attaining rarification of the atmosphere, more or less, within the closed circulatory path, with the result that there is established and maintained within the chamber B an atmosphere the normal pressure of which is less than the pressure of the outside atmospheric air.

At the beginning of the operation, the temperature of the atmosphere within the apparatus is increased above the temperature that prevails in the normal operation, and such increased temperature results in expansion of the contained atmosphere, with the result that the pressure within the apparatus is initially increased and the vent valve is opened for the escape of some of the contained air, resulting in a decrease in the pressure of the contained atmosphere below the pressure of the outside atmospheric air. After discharging a portion of the contained atmosphere, the temperature is reduced, and the rarefied atmsophere is chilled and heated in the manner described, resulting in a circulation of such rarefied atmosphere with the apparatus, which circulation continues until the atmosphere attains a condition wherein the pressure exceeds the pressure of the outside atmospheric air, and thus the vent valve is opened to reduce the internal pressure, however infrequent or irregular such opening of the vent may take place.

The material present in the chamber is thus dried in a partial vacuum and by the circulation of an atmosphere the temperature and humidity of which is controllable with a view to treating the material under conditions which drives off the aqueous content thereof while leaving the pores open for the free exit of such aqueous content to the surface of the material, whence it is picked up and carried off by the atmosphere, to be condensed by contact with the cold surfaces of the condensers.

The constructional form of apparatus depicted in Figure 2 embodies the essential features hereinbefore described, although the arrangement is somewhat different with a view to the utilization of material carriers in the form of superposed trays.

The exterior housing A' is provided at its top with the valve controlled pressure exit I', and within said housing is arranged the walls $b'$ to produce the material chamber B' and side chambers C'. Near the bottom are partitions $E^2$ corresponding in part to floor E', and at the top is a roof $F^2$ with a central port $f'$. Below the material chamber B' is a heater chamber $E^3$, containing a heater G' with appropriate means for regulating the inflow thereto of a heating medium such as steam. The roof $F^2$ is parallel to the top of housing A' for the formation of a flue $F^3$ leading in two directions to the side chambers C', and within said chambers are condensers H' in the form of coils with appropriate means for controlling the flow therein of a cooling agent, suitable collection troughs $c'$ being provided below the condensers for the reception of the condensate dripping from said condensers.

Within the material chamber B' are trays J arranged in vertical series, the trays of each series being relatively spaced to produce flow channels $j$ between said trays. The vertically grouped trays are separated to produce a central space $j'$ and side spaces $j^2$, which spaces are spanned by baffles $J'$ $J^2$ positioned relatively to the trays to establish a tortuous continuous flow channel within chamber $B'$.

The trays are removable from the chamber, being supported therein by appropriate slides in the form of angle irons. As shown, the lower horizontal trays cooperate with the parts $E^2$ to form the bottom of the treating chamber $B'$. The baffles $J'$ $J^2$ are positioned in the horizontal planes of other trays and in such relation thereto and to each other as to form a plurality of tortuous circulatory paths for the drying atmosphere.

K are reheaters or boosters in the form of coils positioned within the circulatory paths constituted in part by the flow channels intermediate the trays, said coils being in the vertical planes of said trays, and each coil being in the channel bounded by the trays above and below said channel. The reheaters or boosters are supplied with a heating medium of a desired character, such as steam, and in the course of the drying operation said coils give off heat to the drying atmosphere and to the contents of the trays for the purpose of reheating the air to compensate for the drop in temperature occasioned by the exchange of heat for moisture, whereby the primary heater $G'$ acts mainly to heat the atmosphere to a desired temperature, whereas the reheaters perform the function of boosting the atmosphere with a view either to keeping the temperature constant or to increase the temperature in order to initially expand the atmosphere so as to increase the pressure for the operation of the exit valve, the successive operations of which permits a certain proportion of the drying atmosphere to escape whereby the drying atmosphere is increasingly rarified and the drying operations are conducted in a partial vacuum to the end that the exchange of heat for moisture is expedited with an attendant economy of time and energy.

The operation of the apparatus shown in Figure 2 is similar to that described in connection with Figure 1, the atmosphere being expanded and condensed for effecting circulation within a closed path to which atmospheric air is excluded during the drying period. The trays having been filled and placed within the chamber and the doors tightly closed, steam is supplied to the heater $G'$ and the reheaters K, and a cooling agent admitted to the condensers. The atmosphere is expanded by heat units given off by the heater and reheaters, and is chilled or cooled by contact with the cold surfaces of the condensers, thus setting the atmosphere into motion by the successive expanding and chilling thereof, due to the change in temperatures. The atmosphere is directed to flow in a definite path established by the closed circulatory path comprising chamber $B'$, flue $F'$, cooling chambers $C'$ and heater $E^3$ whereas within the chamber $B'$ the atmosphere flows in the tortuous paths established by the trays and the baffles, the atmosphere ascending from the middle part of chamber $E^3$ and flowing in two directions within the spaces or channels intermediate the trays and emerging from the chamber $B'$ by way of port $f'$ into top flue $F'$ and thence to the cooling chambers. The circulation established by the difference in temperature within different zones of the housing continues without interruption or manual operation for such a period as is or may be necessary to expand the atmosphere and attain a pressure exceeding the external atmosphere pressure, whereupon the vent valve is opened and a certain proportion of the expanded atmosphere escapes, resulting in a reduction of the internal pressure, the repetition of which operations ultimatey attains a rarification of the atmosphere constituting the medium by which the moisture content of the material is eliminated.

It is desired to call attention to the fact that in my invention no moving parts are employed, such as blowers, and no atmospheric air is admitted to the apparatus during the drying period. As usual, the apparatus is equipped with appropriate thermometers for indicating the temperature at different points, and it is equipped also with wet and dry bulb thermometers (hygrodeiks) positioned at appropriate points for indicating the moisture content of the atmosphere. As stated, provision is made for controlling the supply of the heating medium to coils $G'$ K, and of a cooling medium to condensers $C'$, and by regulating said heaters and condensers from time to time it is possible to continue the drying operation for a period, more or less extended, without requiring constant manual attendance.

As herein pointed out, my invention includes the treatment of material in or by any atmosphere the normal pressure of which is below the pressure of the outside atmospheric air, and it includes, also, the circulation of such drying atmosphere in an attenuated or rarified condition, which circulation is effected within a closed path by alternately expanding (heating) and chilling such atmosphere. The drying atmosphere is heated initially to expand it and increase the pressure within the apparatus, whereupon the valved vent is opened by such excess of the internal pressure, resulting in the escape of some of the expanded atmosphere, the effect of which is to attenuate the internal atmosphere and to reduce its pressure below that of the outside of the atmospheric air. At the periods of expansion of the atmosphere the flow of a cooling medium to the condensers is or may desirably be arrested until the desired reduction in pressure of the internal atmosphere is attained. The apparatus may thus be vented by opening the vent valve, which valve normally is closed by the pressure of the outside atmospheric air, and said vent valve being opened only at such periods as when the internal atmospheric pressure exceeds the external atmospheric pressure.

Having thus fully described the invention, what I claim as new and desire to secure by Letters Patent is:

1. In the art of drying, the process which consists in placing the material to be dried within a chamber constituting a part of a closed circulatory path from which outside atmospheric air is excluded and within which circulatory path a partial vacuum is established and maintained, and setting up a circulation of a drying atmosphere in an attenuated condition within said closed circulatory path by alternately expanding and condensing such atmosphere.

2. In the art of drying, the process which consists in placing the material to be dried within a chamber provided with a gravity-closed vent and which chamber constitutes a part of a closed circulatory path from which outside atmospheric air is excluded and within which circulatory path a partial vacuum is established and maintained, heating a drying atmosphere at a definite point within said circulatory path to a pressure exceeding that of the outside atmospheric air, thereby opening said vent to the exit of some of the drying atmosphere, and cooling the drying atmosphere within said circulatory path at a point remote to the heating point.

3. In the art of drying, the process which consists in establishing a partial vacuum within a closed circulatory path from which outside atmospheric air is excluded, and alternately expanding and condensing a rarefied drying atmosphere by heating and cooling the same at different zones within said circulatory path.

4. In the art of drying, the process which consists in venting a closed circulatory path to establish a partial vacuum therein, and alternately expanding and condensing a rarefied drying atmosphere to set up a circulation of said atmosphere within said circulatory path.

5. In the art of drying, the process which consists in placing the material to be treated within a closed circulatory path from which outside atmospheric air is excluded during the treating period and within which circulatory path is established an attenuated drying atmosphere the pressure of which is below that of the outside atmospheric air, expanding and chilling the attenuated drying atmosphere by heating and condensing the same within definite zones of said circulatory path to thereby set the atmosphere into motion within said circulatory path by the difference in temperature established at distinctly different zones, and reheating the drying atmosphere during the period of its flow into contact with the material.

6. In the art of drying, the process which consists in placing the material to be treated within a tortuous flow passage constituting a part of a closed circulatory path from which outside atmospheric air is excluded during the attenuated drying period and within which circulatory path is established an attenuated drying atmosphere the pressure of which is below that of the outside atmospheric air, setting up a flow within said circulatory path and the tortuous flow passage of a drying atmosphere by expanding and chilling the same at definite zones within said circulatory path, and reheating the drying atmosphere in the periods of the flow into contact with the material and within the tortuous flow passage.

7. In the art of drying, the process which consists in placing the material to be treated within a closed circulatory path from which outside atmospheric air is excluded during the drying period and within which circulatory path is established an attenuated drying medium the pressure of which is below that of the outside atmospheric air, setting up a flow of a drying medium within the circulatory path by successively expanding and condensing said atmosphere within definite zones of said circulatory path remote one to the other and for such a period as ultimately results in an increase of the pressure of said drying atmosphere until such pressure exceeds atmospheric pressure, and venting the closed circulatory path by utilizing the pressure of the drying atmosphere therein in opening a valved exit normally maintained in a closed condition by atmospheric pressure.

8. In the art of drying, the process which consists in venting a closed circulatory path from which outside atmospheric air is excluded to establish a partial vacuum within said circulatory path, and setting up the circulation of a rarefied drying atmosphere within said circulatory path by subjecting said rarefied atmosphere to the action of heaters and condensers at different zones within said circulatory path.

9. In the art of drying, the process which consists in venting a closed circulatory path from which outside atmospheric air is excluded and establishing within said path a drying atmosphere in an attenuated condition the pressure of which is below the atmospheric pressure of the outside air, and setting up the flow of said drying atmosphere within said circulatory path by successively expanding and cooling the same.

10. In a drying apparatus, a housing provided with a material containing chamber constituting a part of a closed circulatory path from which outside atmospheric air is excluded and within which is established a drying atmosphere in an attenuated condition, the pressure of which attenuated drying atmosphere is below the pressure of the outside atmospheric air, means for expanding the attenuated drying atmosphere by heating the same at a definite point in the circulatory path, and means for condensing the attenuated drying atmosphere by cooling the same at a definite point within the circulatory path, said condensing and cooling means being remote to the heating and expanding means.

11. In a drying apparatus, a housing provided with a material containing chamber constituting a part of a closed circulatory path from which outside atmospheric air is excluded and within which is established a drying atmosphere in an attenuated condition, the pressure of which attenuated drying atmosphere is below the pressure of the outside atmospheric air, heating means positioned within the circulatory path for expanding the attenuated drying atmosphere at a definite point with respect to the material containing chamber, and condensing means located within the circulatory path at a point remote to the material containing chamber and to the heating means for chilling said attenuated drying atmosphere, said material containing chamber being intermediate said heating means and said condensing means.

12. In a drying apparatus, a housing provided with a material containing chamber constituting a part of a closed circulatory path from which outside atmospheric air is excluded and within which is established a drying atmosphere in an attenuated condition, the pressure of which attenuated drying atmosphere is below the pressure of the outside atmospheric air, means for expanding the attenuated drying atmosphere by heating same at a definite point in the circulatory path, condensing means for chilling the attenuated drying atmosphere, said condensing and chilling means being situated within the circulatory path at a point remote to the heating means, and additional heating means positioned with the material containing chamber for boosting the attenuated drying atmosphere as it flows into contact with moist material.

13. In a drier, a housing provided with a closed circulatory path from which outside atmospheric air is excluded during the drying period, condensing means and heating means positioned at definite points remote to one another and within said circulatory path, and operating to expand and chill a drying atmosphere for setting the same in motion by the difference in temperature, and a valved controlled vent in communication with the circulatory path, said vent being normally closed by the pressure of the external atmospheric air and said valve being opened by the drying atmosphere when the pressure within the housing exceeds that of the external atmospheric air.

14. In a drier, a housing provided with a closed circulatory path including a material chamber and from which closed path outside atmospheric air is excluded during the drying period and within which circulatory path is established an attenuated drying atmosphere, the pressure of which under working conditions is below the pressure of the outside atmospheric air, material supporting means positioned within said material chamber for establishing therein a tortuous passage for the back and forth flow of the attenuated drying atmosphere, heating means and condensing means within different parts of said circulatory path for setting up the flow of said attenuated drying atmosphere by a difference in temperature established in different zones within the circulatory path, and reheating means within the tortuous passage and intermediate the material supporting means.

15. In a drier, a housing provided with a closed circulatory path including a material chamber and from which closed path outside atmospheric air is excluded during the drying period, material supporting means positioned within said material chamber for establishing therein a tortuous passage for the back and forth flow of a drying atmosphere, heating means and condensing means within different parts of said circulatory path for setting up the flow of a drying atmosphere by a difference in temperature established in different zones within the circulatory path, reheating means within the tortuous passage and intermediate the material supporting means, a normally closed vent in communication with said closed circulatory path, said vent being opened by the pressure of the drying atmosphere, and means for collecting the moisture of condensation deposited upon the surfaces of the condenser.

16. In the art of drying, the process which consists in expanding the atmosphere present within a closed circulatory path by heating such atmosphere until the pressure within said path exceeds the outside atmospheric air, venting said circulatory path and permitting the heated atmosphere to escape therefrom for reducing the pressure of such atmosphere within the closed path below the pressure of the outside atmospheric air, thereby attaining an attenuated or rarefied drying atmosphere within said path, and alternately chilling and heating the atmosphere within said closed path for setting up a circulation therein to the exclusion of outside atmospheric air.

17. In the art of drying, the process which consists in heating a drying atmosphere present within a closed circulatory path for expanding such atmosphere and increasing the pressure thereof until it exceeds the pressure of the outside atmospheric air, opening an exit from said closed path for the escape of such expanded atmosphere, thereby reducing the pressure of the atmosphere until it acquires an attenuated or rarefied condition within such closed path, alternately chilling and heating the attenuated atmosphere for effecting the circulation thereof within said closed path, and dividing the flow of the circulating atmosphere as such atmosphere emerges from the presence of the material under treatment.

In testimony whereof I have hereto signed my name this 29th day of April, 1921.

GORDON DON HARRIS.